United States Patent
Rezaei et al.

(10) Patent No.: US 12,205,056 B2
(45) Date of Patent: Jan. 21, 2025

(54) SYSTEMS AND METHODS FOR PASSENGER PICK-UP BY AN AUTONOMOUS VEHICLE

(71) Applicant: GM Cruise Holdings LLC, San Francisco, CA (US)

(72) Inventors: Shahram Rezaei, Danville, CA (US); Michele Lee, Chicago, IL (US); Rohit Hiraman Rajput, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 187 days.

(21) Appl. No.: 17/994,992

(22) Filed: Nov. 28, 2022

(65) Prior Publication Data

US 2024/0177079 A1 May 30, 2024

(51) Int. Cl.
*G06Q 10/06* (2023.01)
*G06Q 10/0631* (2023.01)

(52) U.S. Cl.
CPC .............................. *G06Q 10/06311* (2013.01)

(58) Field of Classification Search
None
See application file for complete search history.

(56) References Cited

U.S. PATENT DOCUMENTS

| | | | |
|---|---|---|---|
| 10,674,306 B2 | 6/2020 | Engle et al. | |
| 11,001,199 B1 | 5/2021 | Galliano et al. | |
| 2016/0334229 A1* | 11/2016 | Ross | G08B 25/00 |
| 2019/0332123 A1* | 10/2019 | Donnelly | G05D 1/0276 |
| 2021/0286651 A1* | 9/2021 | Ho | G06F 3/061 |
| 2021/0311478 A1* | 10/2021 | Pierfelice | G01C 21/3407 |

OTHER PUBLICATIONS

Lazar et al. (Learning how to dynamically route autonomous vehicles on shared roads, Transportation Research Part C: Emerging Technologies, vol. 130, 2021, 103258, ISSN 0968-090X, https://doi.org/10.1016/j.trc.2021.103258.).*
Andrew J. Hawkins, Waymo designed new features to improve AV access for passengers with disabilities, The Verge, dated Aug. 9, 2022.

* cited by examiner

*Primary Examiner* — Matthew D Henry

(57) ABSTRACT

The disclosed technology provides solutions for providing an accurate pick-up location for an autonomous vehicle and a rider during a ride hailing pick-up. A method of the disclosed technology can include steps for determining map information associated with at least one thoroughfare for routing an autonomous vehicle, wherein the map information is based on location data associated with a client device requesting the autonomous vehicle; receiving sensor data from the client device corresponding to the at least one thoroughfare; determining, based on the sensor data and the map information, a first position of the client device relative to the at least one thoroughfare; and routing the autonomous vehicle based on the first position of the client device relative to the at least one thoroughfare. Systems and machine-readable media are also provided.

12 Claims, 6 Drawing Sheets

SYSTEMS AND METHODS FOR PASSENGER PICK-UP BY AN AUTONOMOUS VEHICLE

BACKGROUND

1. Technical Field

The present disclosure generally relates to autonomous vehicles and in particular, provides techniques for performing passenger pick-up by an autonomous vehicle.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning, and obstacle avoidance.

BRIEF DESCRIPTION OF THE DRAWINGS

Certain features of the subject technology are set forth in the appended claims. However, the accompanying drawings, which are included to provide further understanding, illustrate disclosed aspects and together with the description explain the principles of the subject technology. In the drawings:

DETAILED DESCRIPTION

Figure 1:
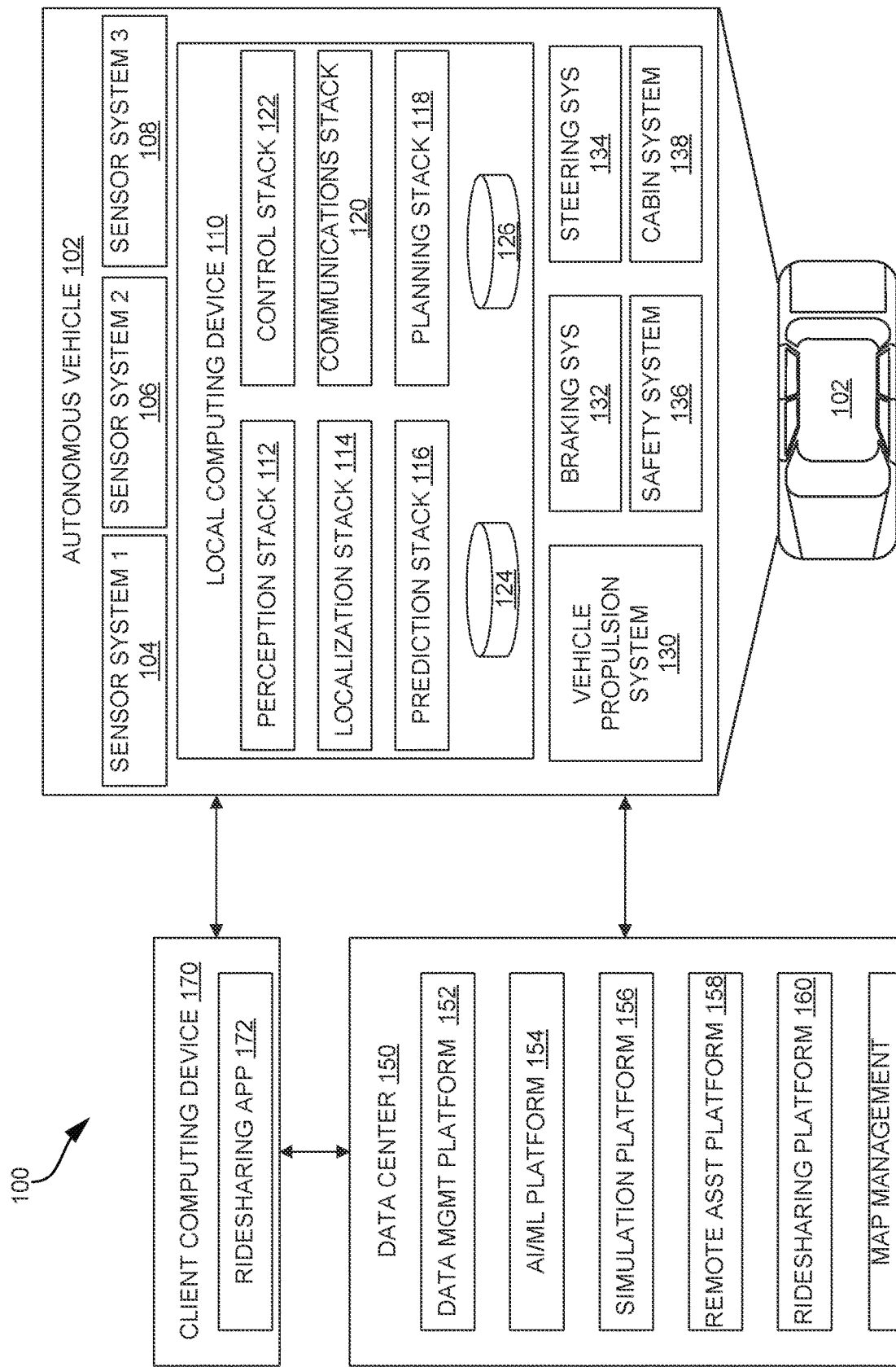
FIG. 1 illustrates an example system environment that can be used to facilitate AV dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring certain concepts.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Dispatch systems for AVs typically rely on the position information provided by the rider's mobile device that is mostly based on mobile device's global navigation satellite system (GNSS, also commonly known as GPS) to identify the pick-up location. However, the mobile device position is limited to meter-level accuracy and the accuracy may degrade significantly in places with GNSS signal obstructions, like in urban canyon environments. Thus, the pick-up location that is determined based on the GNSS data may be inaccurate and have several meter errors from the actual location of the rider.

Due to these limitations on the accuracy of mobile device location, when the AV arrives at the requested location the rider may be required to travel several meters (or more) to reach the location of the waiting AV. In some examples, the AV can be waiting across the street from the rider or obstructed from the rider's view. These scenarios can present challenges to the rider in many circumstances. For example, a rider many be prevented from safely crossing a busy street to approach the waiting AV if there are no crosswalks nearby. In other examples, the AV may be hidden from the rider's field of vision due to a large obstruction such as a double-parked delivery truck; or the rider may be unable to determine which AV is the correct AV in a crowded area where several AVs are waiting to pick up riders.

These challenges can be especially difficult for riders with disabilities. For example, a visually impaired rider may have trouble finding and navigating to a waiting AV that has stopped a distance away from the rider. In another example, a visually impaired rider may have trouble finding a waiting AV stopped across the street from the rider when the rider was expecting the AV to stop on the same side of the street as the rider. In another example, a wheelchair user may not be able to approach a waiting AV that has parked a distance away that is up a steep hill or across the street, among other difficulties. These problems are unique to ride hailing AVs due to the lack of human driver operating the AVs. That is, a human driver can see a waiting rider and drive directly to that waiting rider. A human driver can wave, yell, or honk their horn to a waiting rider, and if necessary, exit the car to assist a waiting rider. A driverless AV, however, does not have these options available and therefore techniques are needed to facilitate and improve passenger pick-up for an AV. Specifically, the systems and techniques described herein can detect the side of the street that the rider is located on so that the AV can navigate to the correct side of the street to be close to the rider's precise location. For example, AV map data can be combined with sensor data obtained from a rider's mobile device (e.g., an angle measured by a rider's mobile device's compass (i.e. magnetometer sensor)) to determine the side of street the rider is located on. Further, the present technology can be used to guide the rider to the waiting AV by utilizing radio frequency (RF) sensing (e.g., Ultra Wide Band (UWB) wireless or equivalent technologies) to pinpoint the location of the rider and provide instructions to the rider for locating the AV.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), optical sensors (e.g., LIDAR systems, ambient light sensors, infrared sensors, etc.), RADAR systems, GNSS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Mapping and localization stack 114 can determine the AV's position and orientation (pose) using different methods from multiple systems (e.g., GNSS, IMUs, cameras, LIDAR, RADAR, ultrasonic sensors, the HD geospatial database 126, etc.). For example, in some embodiments, AV 102 can compare sensor data captured in real-time by sensor systems 104-108 to data in HD geospatial database 126 to determine its precise (e.g., accurate to the order of a few centimeters or less) position and orientation. AV 102 can focus its search based on sensor data from one or more first sensor systems (e.g., GNSS) by matching sensor data from one or more second sensor systems (e.g., LIDAR). If the mapping and localization information from one system is unavailable, AV 102 can use mapping and localization information from a redundant system and/or from remote data sources.

Prediction stack 116 can receive information from localization stack 114 and objects identified by perception stack 112 and predict a future path for the objects. In some embodiments, prediction stack 116 can output several likely paths that an object is predicted to take along with a probability associated with each path. For each predicted path, prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate AV 102 safely and efficiently in its environment. For example, planning stack 118 can receive the location, speed, and direction of AV 102, geospatial data, data regarding objects sharing the road with AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. Planning stack 118 can determine multiple sets of one or more mechanical operations that AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. Control stack 122 can receive sensor signals from the sensor systems 104-108 as well as communicate with other stacks or components of the local computing device 110 or a remote system (e.g., the data center 150) to effectuate operation of AV 102. For example, control stack 122 can implement the final path or actions from the multiple paths or actions provided by planning stack 118. This can involve turning the routes and decisions from planning stack 118 into commands for the actuators that control the AV's steering, throttle, brake, and drive unit.

Communications stack 120 can transmit and receive signals between the various stacks and other components of AV 102 and between AV 102, data center 150, client computing device 170, and other remote systems. Communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of AV 102 and/or data received by AV 102 from remote systems (e.g., data center 150, client computing device 170, etc.). In some embodiments, the raw AV data can include HD LIDAR point cloud data, image data, RADAR data, GNSS data, and other sensor data that data center 150 can use for creating or updating AV geospatial data or for creating simulations of situations encountered by AV 102 for future testing or training of various machine learning algorithms that are incorporated in local computing device 110.

Data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. Data center 150 can include one or more computing devices remote to local computing device 110 for managing a fleet of AVs and AV-related services. For example, in addition to managing AV 102, data center 150 may also support a ridesharing service, a delivery service, a remote/roadside assistance service, street services (e.g., street mapping, street patrol, street cleaning, street metering, parking reservation, etc.), and the like.

Data center 150 can send and receive various signals to and from AV 102 and client computing device 170. These signals can include sensor data captured by the sensor systems 104-108, roadside assistance requests, software updates, ridesharing pick-up and drop-off instructions, and so forth. In this example, data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

AI/ML platform 154 can provide the infrastructure for training and evaluating machine learning algorithms for operating AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for AV 102, remote assistance platform 158, ridesharing platform 160, map management platform 162, and other platforms and systems. The simulation platform 156 can replicate a variety of driving environments and/or reproduce real-world scenarios from data captured by AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of data center 150, remote assistance platform 158 can prepare instructions for one or more stacks or other components of AV 102.

Ridesharing platform 160 can interact with a customer of a ridesharing service via a ridesharing application 172 executing on client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing ridesharing application 172. Client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GNSS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of data center 150. For example, the AI/ML platform 154 may incorporate the map viewing services for visualizing the effectiveness of various object detection or object classification models, simulation platform 156 may incorporate the map viewing services for recreating and visualizing certain driving scenarios, remote assistance platform 158 may incorporate the map viewing services for replaying traffic incidents to facilitate and coordinate aid, ridesharing platform 160 may incorporate the map viewing services into ridesharing application 172 to enable passengers to view AV 102 in transit en route to a pick-up or drop-off location, and so on.

Figure 2:
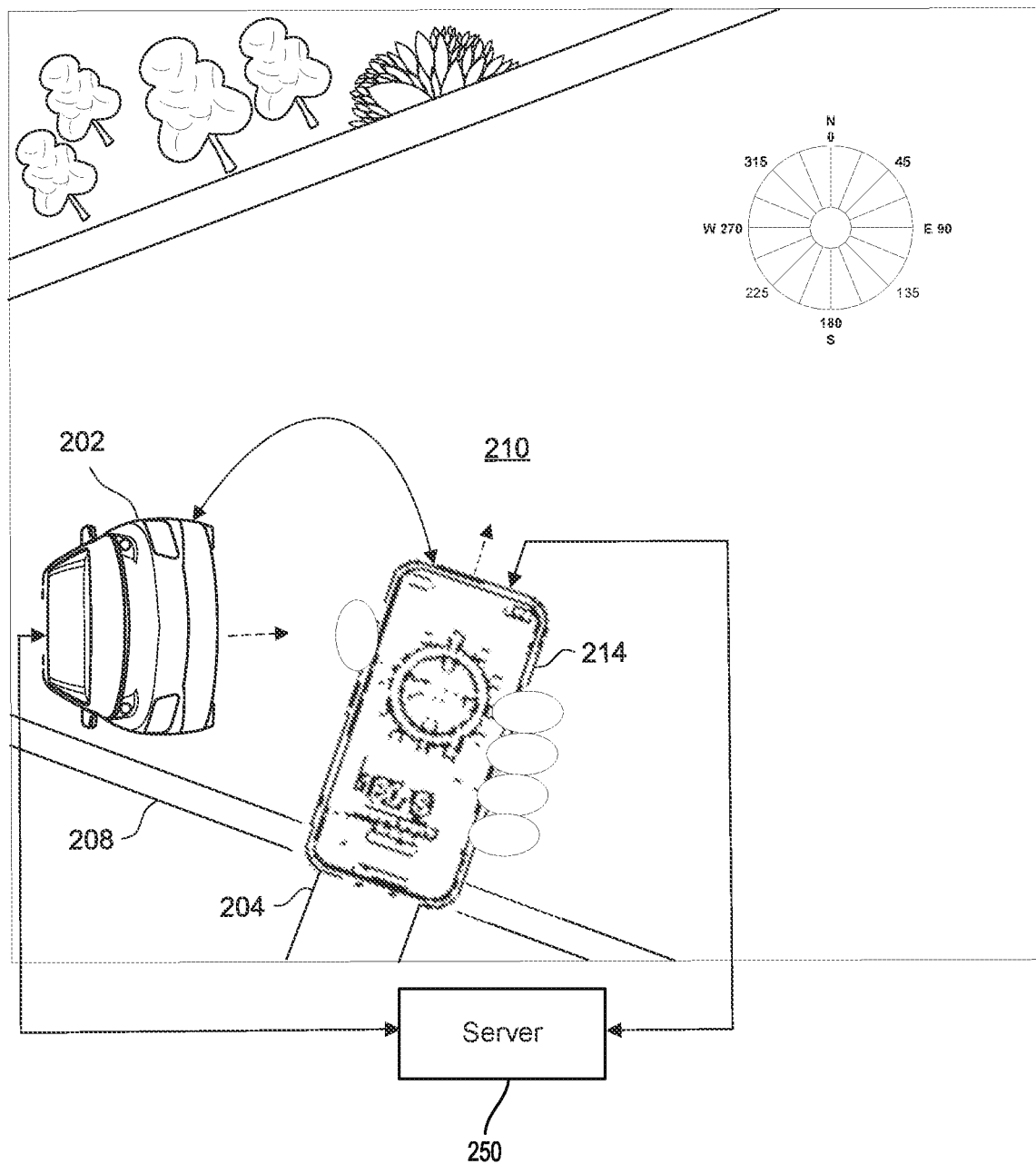
FIG. 2 illustrates an example scenario for determining a rider's location for pick-up by an autonomous vehicle (AV), according to some aspects of the disclosed technology.

FIG. 2 illustrates an example scenario for determining a rider's location (e.g., the side of the street the rider is located on), according to some aspects of the disclosed technology. As discussed above, it can be advantageous to the rider if the AV is aware of the side of the street that the rider is waiting on so the AV can stop in front of the waiting rider on the correct side of the street. The AV can determine the side of the street to pick up the rider by using data obtained from one or more sensors (e.g., magnetometer, camera, accelerometer, gyroscope, etc.) associated with the rider's mobile device and map data corresponding to the rider's location (e.g., based on GNSS data).

In the scenario illustrated in FIG. 2, rider 204 has requested a pick-up via the rider's mobile device 214. In some aspects, the rider's mobile device 214 may correspond to client computing device 170 that may execute ridesharing app 172. Once the AV 202 has been notified that rider 204 has requested a pick-up, the AV 202 can utilize map data to navigate to the location of the rider. In some examples of the present invention, a server 250 can provide the AV 202 with additional data indicating which side of the street 210 the rider 204 is waiting on. In other examples, the rider's mobile device 214 can directly notify the AV 202 which side of the street 210 the rider 204 is waiting on.

As shown in FIG. 2, rider 204 is waiting on side 208 of street 210 for AV 202. In some examples, after requesting an AV for a pick-up, the rider 204 can be prompted by the rider's mobile device 214 to hold the mobile device 214 up along the direction of travel of the vehicles in the lane next to them. In some examples, the mobile device 214 can determine the direction (e.g., the angle measured by the magnetometer sensor of the mobile device 214) that the mobile device 214 is pointed. In some examples, this measured angle can be transmitted to server 250, which can compare the measured angle to the known map data to determine which side of the street the rider 204 is located on. For example, if rider 204 is waiting on a street that travels in east-west directions, and the mobile device 214 measures that the angle is pointed north, then the server 250 can infer that the rider is located on the south side of the east-west street. Alternatively, if rider 204 is waiting on a street that travels in east-west directions, and the mobile device 214 measures that the angle is pointed south, then the server 250 can infer that the rider is located on the north side of the east-west street.

The server 250 can determine which side of the street the rider 204 is located on by comparing the direction of the street and the angle measured from the mobile device 214's magnetometer sensor. In some examples, the mobile device 214 can transmit the measured angle directly to the AV 202 and the AV 202 can determine which side of the street the rider 204 is located by using the map data stored at the AV 202. In other examples, it is contemplated that the mobile device 214 can make the determination of which side of the street the rider 204 is located using the same method and transmit this determination directly to AV 202.

In some cases, after requesting an AV for a pick-up, the rider 204 can be prompted by the rider's mobile device 214 to use the camera sensor to take a photo or a video of the street. In some examples, the photo or video may be used by the mobile device 214, the server 250, and/or the AV 202 to determine the side of the street the rider 204 is located on. For example, data from the photo or video can be extracted and compared to feature from an HD map to determine the pose of the mobile device 214 when capturing the photo or video.

In some scenarios, the rider 204 can be vision impaired and unable to determine the travel direction of the vehicles in order to properly hold the mobile device 214 in the correct direction. In this scenario, rider 204 can be prompted to hold the mobile device 214 along multiple directions, wherein at each position the mobile device 214 reads the angle measured by the magnetometer sensor. These measured angles can subsequently be compared with known map data that includes the angle of the street that the rider 204 is waiting on, in order to determine which side of the street the rider 204 is waiting on.

In the case of one-way streets, the present technology provides further techniques for determining which side of the one-way street the rider 204 is located on. In some aspects, rider 204 can be prompted to hold the mobile device 214 facing the street from their perspective. In some cases, the microphone of the mobile device 214 can then detect the sound of the traffic as it travels down the one-way street and use the Doppler effect to determine which direction the traffic is travelling. Doppler effect causes the pitch of the traffic sound from moving vehicles to sound higher as the vehicles approach and sound lower as the vehicles leave the rider 204. In some examples, once the direction of traffic is determined, mobile device 214 can then transmit the direction the traffic is travelling from the perspective of rider 204 to server 250 which can compare this direction to the stored map data comprising the known direction of the one-way street that the rider 204 is waiting on to determine which side of the street the rider 204 is located on. In other examples, mobile device 214 can transmit and communicate this data directly to AV 202, where the side of the street that the rider 204 is waiting on is determined by either the AV 202 or the mobile device 214.

Figure 3:
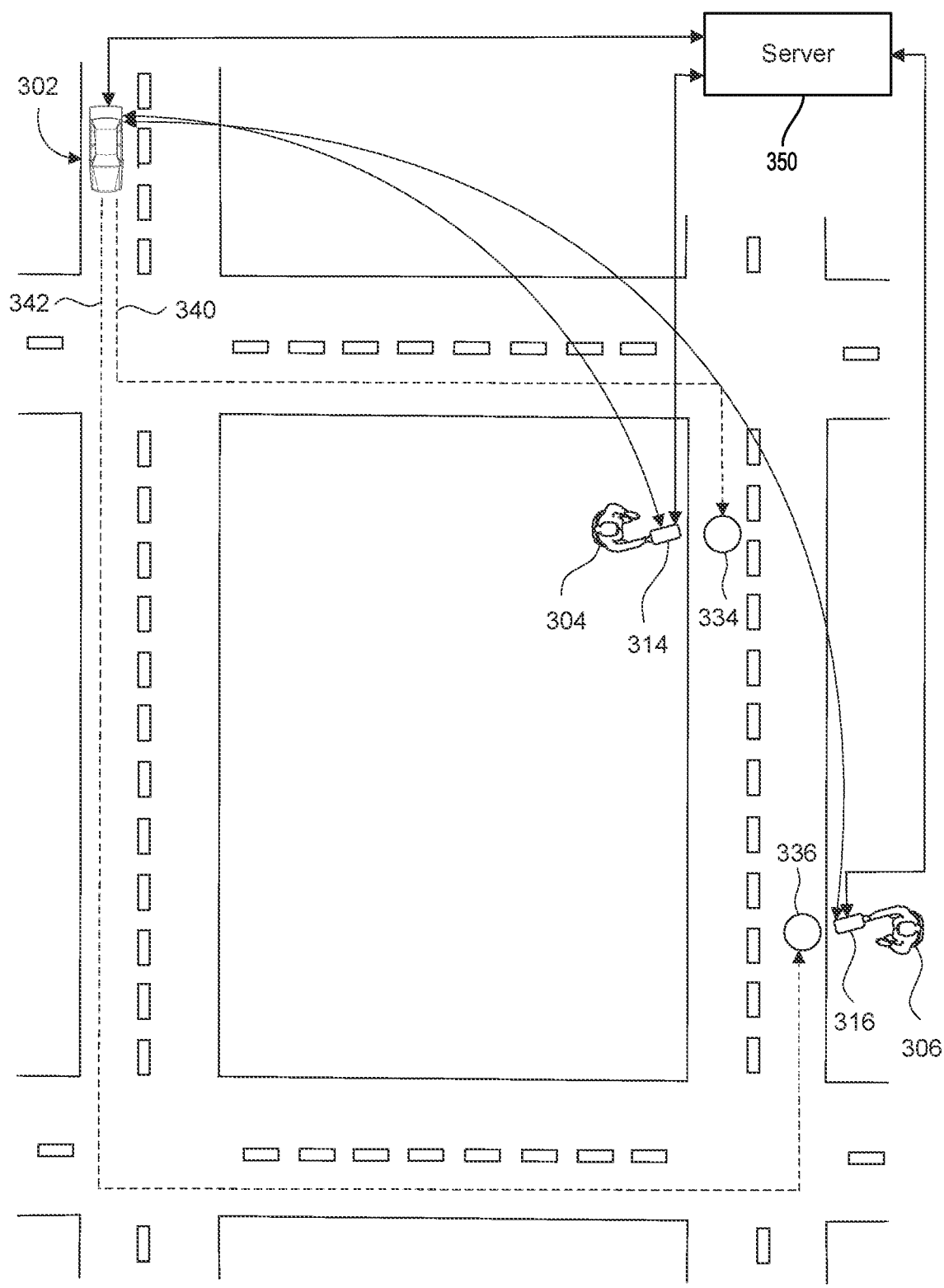
FIG. 3 illustrates an example scenario for routing an AV to pick-up a rider on the correct side of the street, according to some aspects of the disclosed technology.

Turning now to FIG. 3, two example scenarios are illustrated for routing an AV to pick up a rider on the correct side of the street, according to some aspects of the disclosed technology, are shown. In the first scenario, rider 304 has requested an AV to pick up rider 304 at location 334 using mobile device 314. AV 302 has received the request and is headed to pick up rider 304 at location 334. In this example, rider 304 has positioned mobile device 314 towards the street such that mobile device 314 can use a magnetometer to measure an angle or direction of the mobile device 314 relative to the street (e.g., as described above with respect to FIG. 2). In some aspects, the mobile device 314 can transmit this angle data to server 350. Server 350 can then determine which side of the street the rider 304 is located by using the angle data obtained from the mobile device 314' and map data. Server 350 can then transmit this information (e.g., which side of the street the rider 304 is waiting on) to AV 302. In some examples, this information (e.g., which side of the street the rider 304 is waiting on) can then be used by AV 302 to route AV 302 the proper way so that AV 302 picks up rider 304 at location 334 on the correct side of the street. For example, arrow 340 shows a path that will enable AV 302 to pick up rider 304 at location 334 on the same side of the street that rider 304 is waiting.

In the second scenario, rider 306 has requested an AV to pick up rider 306 at location 336 using mobile device 316. AV 302 has received the request and is headed to pick up rider 306 at location 336. AV 302 can determine which side of the street the rider 306 is waiting on and subsequently route AV 302 to rider 306 via arrow 342, thereby picking up rider 306 at location 336 on the correct side of the street. It is further contemplated that the determination of which side of the street the rider 304 or rider 306 is waiting on can be done by either the rider's mobile device 314 or mobile device 316, server 350, AV 302, or any combination thereof.

Figure 4A:
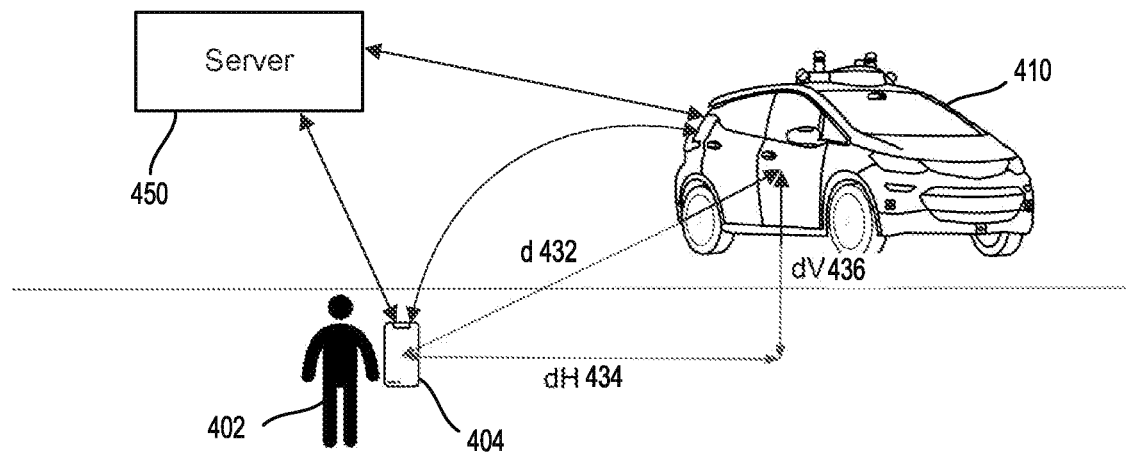
FIG. 4A illustrates an example system for determining passenger location during pick-up by an AV, according to some aspects of the disclosed technology.

FIG. 4A illustrates an example system for determining passenger location during pick-up by an AV, according to some aspects of the disclosed technology. As discussed above, in addition to determining which side of the street a rider is waiting on, it can also be helpful to a rider to receive instructions indicating precisely where the AV is waiting for the rider so that the rider can proceed towards the waiting AV. For various reasons the AV may not stop directly in front of the waiting rider. And, for various reasons, the rider may not be able to find the waiting AV. For example, limitations on the accuracy of mobile device location can direct the car to a location several meters away from a rider. Additionally, there may not be any available space for the AV to stop directly in front of the waiting rider. For some riders, it can be advantageous for the rider to receive directions that will direct the rider to the AV parked at distance away from the location where the rider was waiting.

As described in more detail in # patent application Ser. No. 17/394,472 entitled "Systems and Methods for Improving Accuracy of Passenger Pick-Up Location for Autonomous Vehicles" filed on Aug. 5, 2021, and incorporated by reference herein, the AVs can be equipped with a sensor suite that includes wireless ranging technology that can be configured to perform radio frequency (RF) sensing. For example, AV 410 can include one or more of a Ultra-Wide Band (UWB) transceiver, a UWB receiver, and/or a UWB transmitter. The UWB transceiver/transmitter is configured to transmit UWB signals. The UWB transceiver/receiver is configured to receive UWB signals. Using the wireless ranging technology, this sensor suite can determine the distance (d) between the AV 410 and rider 402's mobile device 404 with centimeter-level accuracy (e.g., based on time-of-flight (ToF) and/or angle-of-arrival (AoA) of the transmitted and received UWB signals). In some examples, once the AV 410 arrives at a location near the passenger's requested location, a mobile phone App on the rider 402's smartphone 404 (or an equivalent device) can guide the rider 402 to the AV 410 by analyzing the precise range (distance) and angle information between the rider 402's smartphone 404 and the AV 410 that are computed utilizing UWB or equivalent technologies. In one implementation, the rider 402 may be asked to move the smartphone 404 from right to left (or vice versa) for the mobile phone App to determine the side of the street where the AV 410 is located.

In some examples, the vertical distance (dV 436), the horizontal distance (dH 434), and/or the distance (d 432) can be used by server 450 to determine the location of mobile device 404 relative to AV 410. In some aspects, the server 450 can subsequently provide the distance (d 432), vertical distance (dV 436), and/or horizontal distance (dH 434) to rider 402's mobile device 404. In other examples, the vertical distance (dV 436), the horizontal distance (dH 434), and/or the distance (d 432) can be used by AV 410 to determine the location of mobile device 404 relative to AV 410. In some cases, the AV 410 can subsequently provide the distance (d 432), vertical distance (dV 436), and/or horizontal distance (dH 434) to rider 402's mobile device 404. In still other examples, the vertical distance (dV 436), the horizontal distance (dH 434), and/or the distance (d 432) can be used by mobile device 404 to determine the location of mobile device 404 relative to AV 410. In each scenario, the mobile device 404 can be provided with a distance (d 432) at a centimeter-level accuracy between the AV 410 and rider 402's mobile device 404.

Once the rider 402's mobile device 404 has received (or calculated) the distance (d 432) between the AV 410 and rider 402's mobile device 404, the mobile device 404 can provide instructions to the rider 402 to guide the rider 402 to the AV 410. In some aspects, the instructions can include haptic feedback, audio instruction(s), textual instruction(s), and/or any combination thereof. In some examples, the mobile device 404 comprises biometric data of rider 402 such as rider 402's height. This height information can be used together with the distance (d 432) data to calculate the number of steps that the rider 402 needs to take in order to reach AV 410. In some examples, voice commands can be provided to the rider 402 that direct the rider 402 towards the AV 410. For example, ridesharing app 172 can provide audible instructions directing rider 402 to the location of AV 410. In another example, a human operator associated with AV 410 may call rider 402 (e.g., via mobile device 404) and provide live instructions to rider 402 regarding the location of AV 410.

In some examples, the path for the rider 402 to the AV 410 can be illustrated on the screen of mobile device 404 for the rider 402 to follow visually. In some examples, the camera sensor of AV 410 and/or the LiDAR sensor of AV 410 can identify and track the rider 402 to provide dynamic real-time instructions (e.g., AV camera can determine if the rider 402 turns in a direction away from AV 410). In some examples, the mobile device 404 can vibrate if the rider 402 makes a wrong turn to notify rider 402 that they are not headed in the correct direction. In some examples, if the rider 402 is a wheelchair user, the mobile device 404 can calculate the time required for the rider 402 to reach the AV 410 and subsequently guide the rider 402 to the AV 410 by providing the calculated time to the rider 402 via the mobile device 404.

Figure 4B:
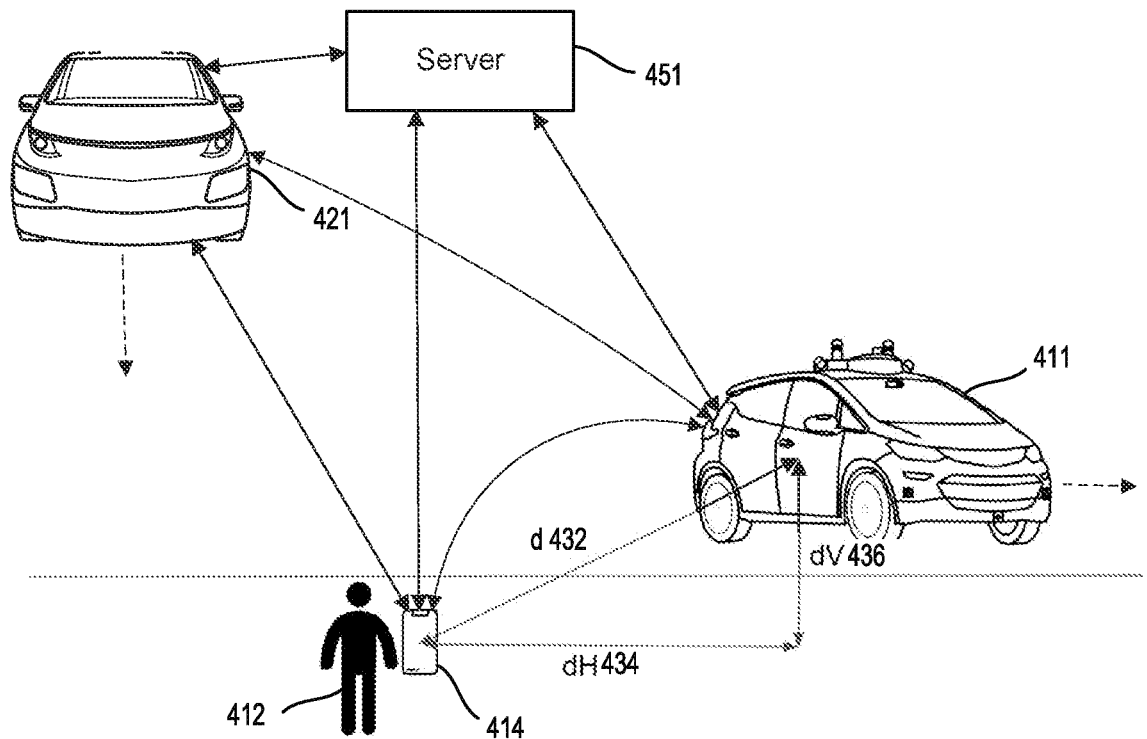
FIG. 4B illustrates another example system for determining passenger location during pick-up by an AV, according to some aspects of the disclosed technology.

Turning to FIG. 4B, which illustrates another example system for determining passenger location during pick-up by an AV, according to some aspects of the disclosed technology. In the example illustrated in FIG. 4B, rider 412 has requested an AV for pick-up using mobile device 414. In this example, AV 421 has been assigned to pick up rider 412, while AV 411 is en route to pick up another rider at a different location. In some examples, AV 411 can use RF sensing (e.g., UWB technology) as described above to determine the precise location (e.g., within centimeter accuracy) of the rider 412 that is awaiting AV 421. AV 411 can subsequently provide this location data to AV 411 so that AV 411 can approach rider 412's precise location. The location data can be provided from AV 411 to AV 421 in a number of different ways. For example, AV 411 can transmit rider 412's location to server 451 which subsequently can transmit it to AV 421. In some examples, AV 411 can transmit rider 412's location directly to AV 421. In some examples, AV 411 can transmit rider 412's location to rider 412's mobile device 414, which can subsequently transmit the location to AV 421.

In some examples, AV 421 can route itself to the precise location where rider 412 is waiting based on the location data provided by AV 411. In some examples, AV 421 can not travel to the precise location. For example, no parking may be available at the rider 412's location and therefore the AV 421 may have to park a distance away from rider 412. In this scenario, rider 412's mobile device 414 can guide rider 412 to AV 421 once AV has arrived in the similar manner described above. For example, server 451 can send instructions to mobile device 414 directing rider 412 to the location of AV 421.

Figure 5:
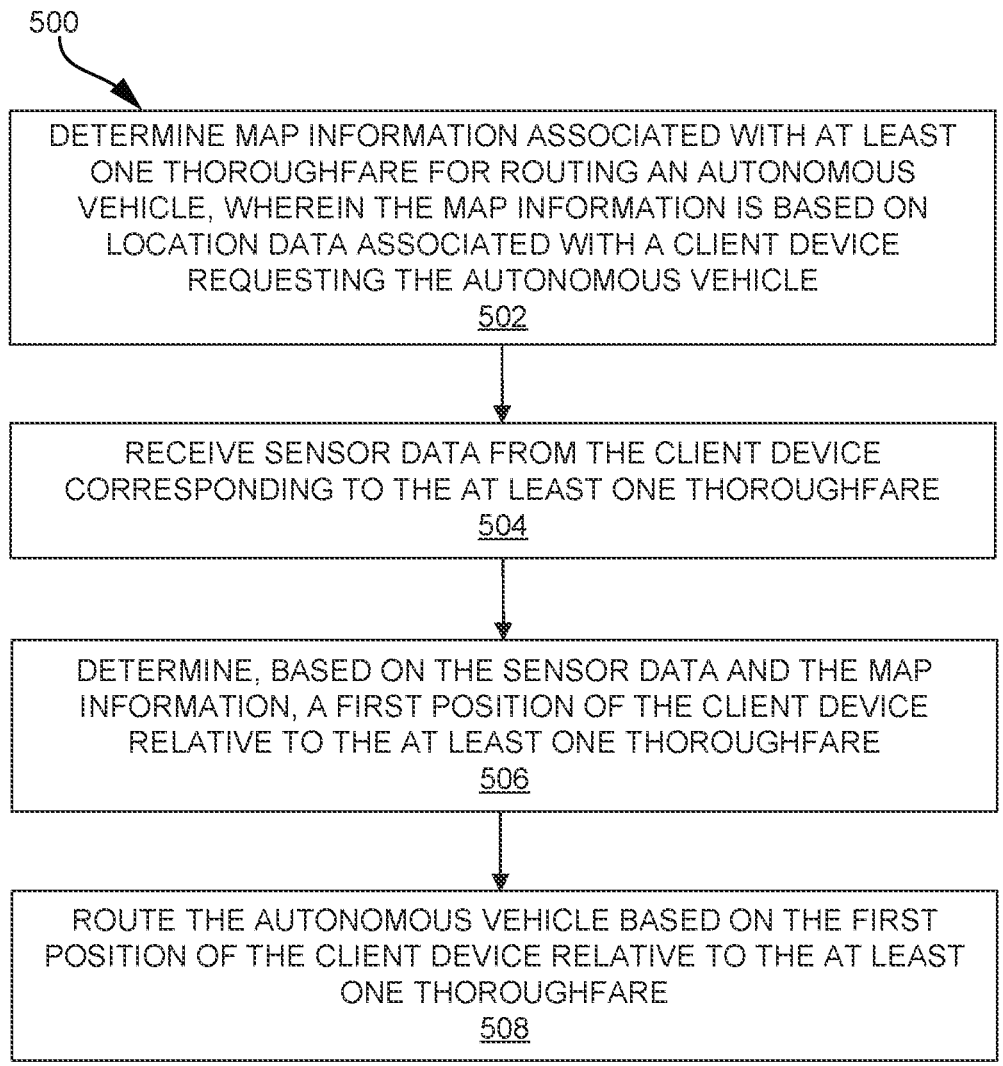
FIG. 5 is a flowchart illustrating an example method for performing passenger pick-up by an AV, according to some aspects of the disclosed technology.

FIG. 5 is a flowchart illustrating an example method 500 for routing an autonomous vehicle based on the location of a client device, according to some aspects of the disclosed technology. At block 502, the method 500 can include determining map information (e.g., street name, a street direction, a number of lanes, and/or a traffic direction) associated with at least one thoroughfare for routing an autonomous vehicle (e.g., AV 202) wherein the map information is based on location data associated with a client device (e.g., rider's mobile device 214) requesting the autonomous vehicle. As discussed above with reference to FIG. 2, once the AV 202 has been notified that rider 204 has requested a pick-up, the AV 202 utilizes map data to navigate to the location of the rider (e.g., based on GNSS data associated with mobile device 214).

At block 504, the method 500 can include receiving sensor data (e.g., at least one heading relative to the at least one thoroughfare) from the client device (e.g., rider's mobile device 214) corresponding to the at least one thoroughfare. As discussed above, the mobile device 214 can determine the direction (e.g., the angle measured by the magnetometer sensor of the mobile device 214) that the mobile device 214 is pointed. In some examples, this measured angle can be transmitted to server 250, which can compare the measured angle to the known map data to determine which side of the street the rider 204 is located on.

At block 506, the method 500 can include determining, based on the sensor data and the map information, a first position of the client device (e.g., rider's mobile device 214) relative to the at least one thoroughfare. As discussed above, the server 250 can determine which side of the street the rider 204 is located on by comparing the direction of the street (e.g., the map information) and the angle measured from the mobile device 214's magnetometer sensor (e.g., sensor data). In some examples, the rider 204's mobile device 214 can transmit the measured angle directly to the AV 202 and the AV 202 can determine which side of the street the rider 204 is located by using the map data stored at the AV 202. In other examples, it is contemplated that the rider 204's mobile device 214 can make the determination of which side of the street the rider 204 is located using the same method and transmit this determination directly to AV 202.

At block 508, the method 500 can include routing the autonomous vehicle (e.g., AV 302) based on the first position of the client device (e.g., rider's mobile device 314) relative to the at least one thoroughfare. For instance, the mobile device 314's magnetometer sensor can determine an angle and mobile device 314 may subsequently transmit this angle data to server 350. Server 350 can then determine which side of the street the rider 304 is located by using this angle data obtained from the rider 304's mobile device 314's combined with known map data. Server 350 can then transmit this information (e.g., which side of the street the rider 304 is waiting on) to AV 302. In some examples, this information (e.g., which side of the street the rider 304 is waiting on) can then be used by AV 302 to route AV 302 the proper way so that AV 302 picks up rider 304 at location 334 on the correct side of the street. As illustrated in FIG. 3, arrow 340 shows a path that will enable AV 302 to pick up rider 304 at location 334 on the same side of the street that rider 304 is waiting.

Figure 6:
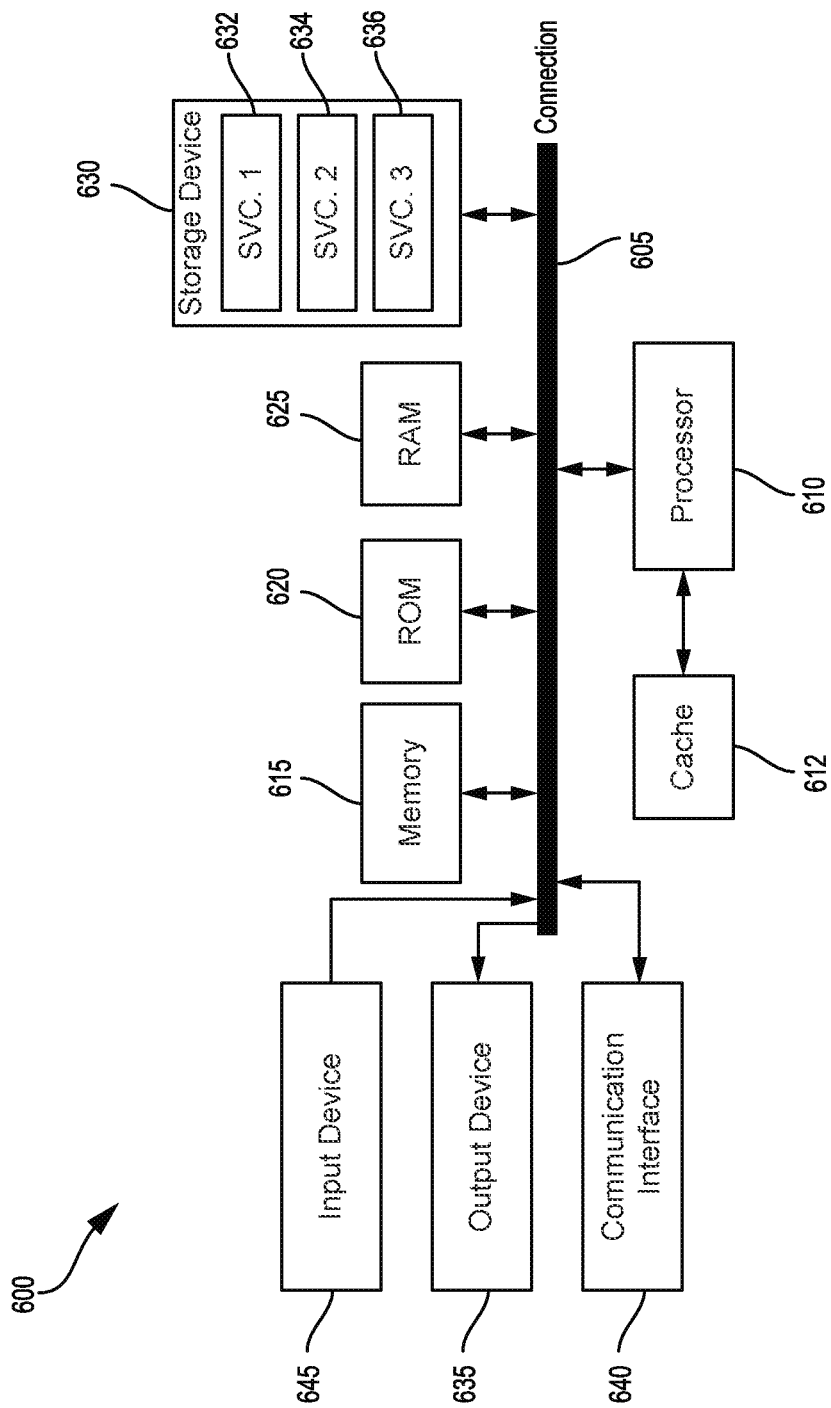
FIG. 6 illustrates an example processor-based system with which some aspects of the subject technology can be implemented.

FIG. 6 illustrates an example apparatus (e.g., a processor-based system) with which some aspects of the subject technology can be implemented. For example, processor-based system 600 can be any computing device making up local computing device 110, data center 150, client computing device 170 executing the rideshare app 172, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

Computing system 600 can be (or may include) a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Illustrative examples of the disclosure include:

Aspect 1. A method comprising: determining map information associated with at least one thoroughfare for routing an autonomous vehicle, wherein the map information is based on location data associated with a client device requesting the autonomous vehicle; receiving sensor data from the client device corresponding to the at least one thoroughfare; determining, based on the sensor data and the map information, a first position of the client device relative to the at least one thoroughfare; and routing the autonomous vehicle based on the first position of the client device relative to the at least one thoroughfare.

Aspect 2. The method of Aspect 1, wherein the map information associated with the at least one thoroughfare includes at least one of a street name, a street direction, a number of lanes, and a traffic direction.

Aspect 3. The method of Aspect 1 or 2, wherein the sensor data includes at least one heading relative to the at least one thoroughfare.

Aspect 4. The method of Aspect 3, wherein determining the first position of the client device relative to the at least one thoroughfare comprises: comparing the at least one heading relative to the at least one thoroughfare to a street direction determined from the map information.

Aspect 5. The method of any of Aspects 1 to 4, further comprising: sending a request for the sensor data to the client device, wherein the request includes at least one instruction for obtaining the sensor data.

Aspect 6. The method of Aspect 5, wherein the at least one instruction indicates an orientation of the client device for obtaining the sensor data.

Aspect 7. The method of any of Aspects 1 to 6, further comprising: determining, based on radio frequency (RF) sensing, a second position of the client device relative to the autonomous vehicle; and sending at least one instruction to the client device, wherein the at least one instruction provides guidance to the autonomous vehicle.

Aspect 8. The method of Aspect 7, wherein the at least one instruction includes at least one of haptic feedback, an audio instruction, and a textual instruction.

Aspect 9. A system comprising: one or more processors; and at least one computer-readable storage medium having stored therein instructions which, when executed by the one or more processors, cause the one or more processors to: determine map information associated with at least one thoroughfare for routing an autonomous vehicle, wherein the map information is based on location data associated with a client device requesting the autonomous vehicle; receive sensor data from the client device corresponding to the at least one thoroughfare; determine, based on the sensor data and the map information, a first position of the client device relative to the at least one thoroughfare; and route the autonomous vehicle based on the first position of the client device relative to the at least one thoroughfare.

Aspect 10. The system of Aspect 9, wherein the map information associated with the at least one thoroughfare includes at least one of a street name, a street direction, a number of lanes, and a traffic direction.

Aspect 11. The system of Aspect 9 or 10, wherein the sensor data includes at least one heading relative to the at least one thoroughfare.

Aspect 12. The system of Aspect 11, wherein first position of the client device relative to the at least one thoroughfare is determined by comparing the at least one heading relative to the at least one thoroughfare to a street direction determined from the map information.

Aspect 13. The system of any of Aspects 9 to 12, wherein the instructions, when executed by the one or more processors, cause the one or more processors to: send a request for the sensor data to the client device, wherein the request includes at least one instruction for obtaining the sensor data.

Aspect 14. The system of Aspect 13, wherein the at least one instruction indicates an orientation of the client device for obtaining the sensor data.

Aspect 15. The system of any of Aspects 9 to 14, wherein the instructions, when executed by the one or more processors, cause the one or more processors to: determine, based on radio frequency (RF) sensing, a second position of the client device relative to the autonomous vehicle; and send at least one instruction to the client device, wherein the at least one instruction provides guidance to the autonomous vehicle.

Aspect 16. The system of Aspect 15, wherein the at least one instruction includes at least one of haptic feedback, an audio instruction, and a textual instruction.

Aspect 17. A non-transitory computer-readable storage medium comprising at least one instruction for causing a computer or processor to: determine map information associated with at least one thoroughfare for routing an autonomous vehicle, wherein the map information is based on location data associated with a client device requesting the autonomous vehicle; receive sensor data from the client device corresponding to the at least one thoroughfare; determine, based on the sensor data and the map information, a first position of the client device relative to the at least one thoroughfare; and route the autonomous vehicle based on the first position of the client device relative to the at least one thoroughfare.

Aspect 18. The non-transitory computer-readable storage medium of Aspect 17, wherein the sensor data includes at least one heading relative to the at least one thoroughfare.

Aspect 19. The non-transitory computer-readable storage medium of Aspect 18, wherein to determine the first position of the client device relative to the at least one thoroughfare, the at least one processor is further configured to: compare the at least one heading relative to the at least one thoroughfare to a street direction determined from the map information.

Aspect 20. The non-transitory computer-readable storage medium of any of Aspects 17 to 19, wherein the at least one processor is further configured to: determine, based on radio frequency (RF) sensing, a second position of the client device relative to the autonomous vehicle; and send at least one instruction to the client device, wherein the at least one instruction provides guidance to the autonomous vehicle.

What is claimed is:

1. A method comprising:
    determining map information associated with at least one thoroughfare for routing an autonomous vehicle to a rider, wherein the map information is based on location data associated with a client device of the rider requesting the autonomous vehicle;
    prompting the rider via the client device to point the client device along a direction of travel of vehicles in an adjacent lane adjacent to the rider of the at least one thoroughfare;
    measuring by a magnetometer sensor of the client device an angle relative to the adjacent lane of the at least one thoroughfare;
    receiving sensor data from the client device corresponding to the at least one thoroughfare, wherein the sensor data includes the angle measured by the magnetometer sensor of the client device;
    determining, based on the angle measured by the magnetometer sensor of the client device, the direction of travel of the vehicles in the adjacent lane of the at least one thoroughfare;
    determining, based on the direction of travel of the vehicles in the adjacent lane of the at least one thoroughfare, a side of the at least one thoroughfare that the client device and the rider are located;
    determining, based on the side of the at least one thoroughfare that the client device and the rider are located and the map information, a first position of the client device relative to the at least one thoroughfare; and
    routing the autonomous vehicle based on the first position of the client device relative to the at least one thoroughfare, wherein routing the autonomous vehicle includes an autonomous vehicle software stack operating on a hardware processor of the autonomous vehicle that takes (1) sensor data from a light detection and ranging sensor and a camera sensor of the autonomous vehicle, (2) the map information, and (3) and the first position and establishes a set of maneuvers for the autonomous vehicle to perform.

2. The method of claim 1, wherein the map information associated with the at least one thoroughfare includes a street name, a street direction, a number of lanes, and a traffic direction.

3. The method of claim 1, further comprising:
    determining, after the autonomous vehicle has completed routing to the first position, a second position of the client device relative to the autonomous vehicle based on radio frequency (RF) sensing, wherein the second position indicates a distance between the client device and the autonomous vehicle after the autonomous vehicle has completed routing to the first position; and
    sending at least one instruction to the client device for presenting to the rider, wherein the at least one instruction provides guidance for the rider to arrive at the autonomous vehicle, wherein the at least one instruction is determined based on a height of the rider.

4. The method of claim 3, wherein the at least one instruction includes haptic feedback.

5. A system comprising:
one or more processors; and
at least one computer-readable storage medium having stored therein instructions which, when executed by the one or more processors, cause the one or more processors to:
determine map information associated with at least one thoroughfare for routing an autonomous vehicle to a rider, wherein the map information is based on location data associated with a client device to a rider requesting the autonomous vehicle;
prompt the rider via the client device to point the client device along a direction of travel of vehicles in an adjacent lane adjacent to the rider of the at least one thoroughfare;
measure by a magnetometer sensor of the client device an angle relative to the adjacent lane of the at least one thoroughfare;
receive sensor data from the client device corresponding to the at least one thoroughfare, wherein the sensor data includes the angle measured by the magnetometer sensor of the client device;
determine, based on the angle measured by the magnetometer sensor of the client device, the direction of travel of the vehicles in the adjacent lane of the at least one thoroughfare;
determine, based on the direction of travel of the vehicles in the adjacent lane of the at least one thoroughfare, a side of the at least one thoroughfare that the client device and the rider are located;
determine, based on the side of the at least one thoroughfare that the client device and the rider are located and the map information, a first position of the client device relative to the at least one thoroughfare; and
route the autonomous vehicle based on the first position of the client device relative to the at least one thoroughfare, wherein routing the autonomous vehicle includes an autonomous vehicle software stack operating on a hardware computer of the autonomous vehicle that takes (1) sensor data from a light detection and ranging sensor and a camera sensor of the autonomous vehicle, (2) the map information, and (3) and the first position and establishes a set of maneuvers for the autonomous vehicle to perform.

6. The system of claim 5, wherein the map information associated with the at least one thoroughfare includes a street name, a street direction, a number of lanes, and a traffic direction.

7. The system of claim 5, wherein the instructions, when executed by the one or more processors, cause the one or more processors to:
determine, after the autonomous vehicle has completed routing to the first position, a second position of the client device relative to the autonomous vehicle based on radio frequency (RF) sensing, wherein the second position indicates a distance between the client device and the autonomous vehicle after the autonomous vehicle has completed routing to the first position; and
sending at least one instruction to the client device for presenting to the rider, wherein the at least one instruction provides guidance for the rider to arrive at the autonomous vehicle, wherein the at least one instruction is determined based on a height of the rider.

8. The system of claim 7, wherein the at least one instruction includes haptic feedback.

9. A non-transitory computer-readable storage medium comprising at least one instruction for causing a computer or processor to:
determine map information associated with at least one thoroughfare for routing an autonomous vehicle to a rider, wherein the map information is based on location data associated with a client device to a rider requesting the autonomous vehicle;
prompt the rider via the client device to point the client device along a direction of travel of vehicles in an adjacent lane adjacent to the rider of the at least one thoroughfare;
measure by a magnetometer sensor of the client device an angle relative to the adjacent lane of the at least one thoroughfare;
receive sensor data from the client device corresponding to the at least one thoroughfare, wherein the sensor data includes the angle measured by the magnetometer sensor of the client device;
determine, based on the angle measured by the magnetometer sensor of the client device, the direction of travel of the vehicles in the adjacent lane of the at least one thoroughfare;
determine, based on the direction of travel of the vehicles in the adjacent lane of the at least one thoroughfare, a side of the at least one thoroughfare that the client device and the rider are located;
determine, based on the side of the at least one thoroughfare that the client device and the rider are located and the map information, a first position of the client device relative to the at least one thoroughfare; and
route the autonomous vehicle based on the first position of the client device relative to the at least one thoroughfare, wherein routing the autonomous vehicle includes an autonomous vehicle software stack operating on a hardware computer of the autonomous vehicle that takes (1) sensor data from a light detection and ranging sensor and a camera sensor of the autonomous vehicle, (2) the map information, and (3) and the first position and establishes a set of maneuvers for the autonomous vehicle to perform.

10. The non-transitory computer-readable storage medium of claim 9, wherein the at least one processor is further configured to:
determine, after the autonomous vehicle has completed routing to the first position, a second position of the client device relative to the autonomous vehicle based on radio frequency RF) sensing, wherein the second position indicates a distance between the client device and the autonomous vehicle after the autonomous vehicle has completed routing to the first position; and
sending at least one instruction to the client device for presenting to the rider, wherein the at least one instruction provides guidance for the rider to arrive at the autonomous vehicle, wherein the at least one instruction is determined based on a height of the rider.

11. The method of claim 1, wherein the direction of travel of the vehicles in the adjacent lane of the at least one thoroughfare is further based on accelerometer sensor data from the client device and gyroscope sensor data from the client device.

12. The method of claim 1, wherein the direction of travel of the vehicles in the adjacent lane of the at least one thoroughfare is further based on microphone sensor data from the client device, including analyzing a Doppler effect presented in the microphone sensor data.

* * * * *